(12) United States Patent
Bringfeldt

(10) Patent No.: US 11,477,282 B2
(45) Date of Patent: Oct. 18, 2022

(54) METHOD FOR CONTROLLING OPERATION OF GARDEN EQUIPMENT AND A BATTERY PACK

(71) Applicant: Globe (Jiangsu) Co., Ltd., Jiangsu (CN)

(72) Inventor: Karl-Anders Bringfeldt, Tenhult (SE)

(73) Assignee: Globe (Jiangsu) Co., Ltd., Jiangsu (CN)

( * ) Notice: Subject to any disclaimer, the term of this patent is extended or adjusted under 35 U.S.C. 154(b) by 17 days.

(21) Appl. No.: 16/499,495

(22) PCT Filed: Dec. 28, 2018

(86) PCT No.: PCT/CN2018/124988
§ 371 (c)(1),
(2) Date: Sep. 30, 2019

(87) PCT Pub. No.: WO2020/133249
PCT Pub. Date: Jul. 2, 2020

(65) Prior Publication Data
US 2020/0402676 A1 Dec. 24, 2020

(51) Int. Cl.
*H04L 67/12* (2022.01)
*G16Y 40/35* (2020.01)
(Continued)

(52) U.S. Cl.
CPC .............. *H04L 67/12* (2013.01); *G16Y 10/05* (2020.01); *G16Y 20/10* (2020.01); *G16Y 40/10* (2020.01); *G16Y 40/35* (2020.01); *G16Y 40/60* (2020.01)

(58) Field of Classification Search
CPC ........ G16Y 40/35; G16Y 20/10; G16Y 40/10; G16Y 10/05; G16Y 40/60; H04L 67/12
See application file for complete search history.

(56) References Cited

U.S. PATENT DOCUMENTS

2005/0001586 A1* 1/2005 Tashiro ................. H01M 10/42
320/110
2007/0010915 A1 1/2007 Burson et al.
(Continued)

FOREIGN PATENT DOCUMENTS

CN  104429834 A  3/2015
CN  106933120 A  7/2017
(Continued)

OTHER PUBLICATIONS

Search Report and Written Opinion in related International Patent Application No. PCT/US2018/124988 dated Mar. 6, 2019; 13 pages.

*Primary Examiner* — Jason D Recek
(74) *Attorney, Agent, or Firm* — Rooney IP, LLC

(57) ABSTRACT

A method for controlling operation of garden equipment with a battery pack including a control unit for performing the method, when the battery back is inserted into a recess of the garden equipment and in data communication, via a data bus, with a control unit of the garden equipment. The control unit reads an identifier of the garden equipment, which identifier is used to retrieve operational control data for the specific garden equipment from a memory medium of the control unit. The control unit also collects sensor data from garden equipment sensors and controls the operation of the garden equipment from the control unit based on the retrieved control data and the collected sensor data.

11 Claims, 3 Drawing Sheets

(51) Int. Cl.
    *G16Y 20/10*     (2020.01)
    *G16Y 40/10*     (2020.01)
    *G16Y 10/05*     (2020.01)
    *G16Y 40/60*     (2020.01)

(56) References Cited

U.S. PATENT DOCUMENTS

| | | | |
|---|---|---|---|
| 2015/0039269 A1* | 2/2015 | Mejegard | B60W 40/08 702/182 |
| 2018/0000025 A1* | 1/2018 | He | B05B 12/04 |
| 2019/0075724 A1* | 3/2019 | Becke | H01M 10/488 |
| 2019/0178219 A1* | 6/2019 | Koenen | F02N 11/14 |

FOREIGN PATENT DOCUMENTS

| | | | |
|---|---|---|---|
| WO | 2017145093 A1 | 8/2017 | |
| WO | 2017186372 A1 | 11/2017 | |

\* cited by examiner

METHOD FOR CONTROLLING OPERATION OF GARDEN EQUIPMENT AND A BATTERY PACK

TECHNICAL FIELD

The present invention relates generally to a method of controlling operation of battery-powered garden equipment. The present invention also relates to a battery pack for battery-powered garden equipment.

BACKGROUND ART

There are different types of garden equipment on the market today for performing different specific tasks, such as cutting grass, trimming bushes, cutting trees, blowing leaves etc. Such garden equipment may be powered by gas or electrical motors. Garden equipment with electrical motors may be powered by mains or by battery. The advantage with battery-powered and gas-powered garden equipment is that the user has a greater mobility in a garden. As the battery technology has developed and improved the use of battery-powered garden equipment has steadily increased. Battery-powered garden equipment has the advantage of being much cleaner and also less noisy than gas-powered garden equipment.

Most batteries that are used in garden equipment today are removable and can be removed and charged in a specific charger. A battery consists of one or more battery cells provided in a housing to form a battery pack. The battery pack may be shaped such that it matches a specific garden equipment and only fits in such garden equipment. This way it is secured that a correct battery pack is inserted in the garden equipment. However, recently it has been more and more popular to have general purpose battery packs that fit a wide variety of different garden equipment. In this way it is possible to substantially reduce the number of battery packs and battery chargers that a user needs. Thus, a user may have only two battery packs and one battery charger, but ten different garden tools.

Recently, the development of Internet of Things, IoT, also made its way into battery packs, which now are able to communicate information to a user. Such information may for example be charging level of the battery, but also operational parameters from the garden tool that is powered by the battery pack. For this purpose, the battery is provided with processing circuitry that extracts such data and sends it to the user. The battery pack may also be provided with a memory for storing such operational data, which may be sent to the user later on.

WO2017/186372 discloses such a battery pack for garden equipment including a transceiver in data communication with a network and processing circuitry, i.e. a processor and a memory, configured to receive battery data from battery sensors associated with the battery pack and transmit the battery data over the network to a computing device, such as a mobile telephone. In some embodiments the processing circuitry is also configured to extract operational parameters from the device being powered by the battery pack.

WO2017/145093 takes the development of batteries one step further and discloses a system for providing device configuration via the battery pack, i.e. the battery pack is capable to provide configuration settings form its own memory to the garden tool. In this way it is possible to update the software of the garden tool and its operational characteristics.

Despite the recent and fast development of batteries for use with garden equipment, there is still room for improvement to increase the functionality thereof.

SUMMARY OF INVENTION

An object of the present invention is to provide a method for controlling operation of garden equipment with a battery pack, such that the cost and complexity of the garden equipment can be reduced.

This object is accomplished by a method for controlling the garden equipment with a battery pack, which battery pack comprises a control unit for preforming the method, when the battery back is inserted into a recess of the garden equipment and in data communication, via a data bus, with a control unit of the garden equipment. The method comprises reading, via the data bus, an identifier of the garden equipment; retrieving operational control data for the garden equipment from a memory of the control unit in the battery pack based on the identifier; collecting, via the data bus, sensor data from sensors of the garden equipment; and controlling, via the data bus, the operation of the garden equipment from the control unit based on the retrieved control data and the collected sensor data.

In an exemplary embodiment the method may further comprise sending the collected sensor data wirelessly, via an interface, to an external unit. In yet another exemplary embodiment the method may further comprise storing the collected sensor data in the memory of the control unit in the battery pack.

Another object of the present invention is to provide a battery pack for controlling operation of garden equipment with a battery pack, such that the cost and complexity of the garden equipment can be reduced when using such a battery pack.

This object is accomplished with a battery pack for controlling operation of a garden equipment, when the battery back is inserted into a recess of the garden equipment and in data communication, via a data bus, with a control unit of the garden equipment. The battery pack comprises a control unit comprising a processor and a memory, configured to store instructions, which when executed by the processor, causes the control unit to read, via the data bus, an identifier of the garden equipment; retrieve operational control data for the garden equipment from the memory of the control unit in the battery pack based on the identifier; collect, via the data bus, sensor data from sensors of the garden equipment; and control, via the data bus, the operation of the garden equipment from the control unit based on the retrieved control data and the collected sensor data.

In an exemplary embodiment the control unit of the battery pack may further be caused to send the collected sensor data wirelessly to an external unit and/or store the collected sensor data in the memory of the control unit of the battery pack.

In yet another exemplary embodiment the data bus may be a controller area network. The battery pack may further be configured to receive data for determining torque, RPM, position, temperature or motion of the garden equipment from the garden equipment sensors.

There is also provided a computer program comprising computer program code, which is adapted, if executed on a processor, to implement the method described above.

A battery pack performing the above described method has the advantage of reducing the cost and complexity of the garden equipment. Since the control of garden equipment is performed by the battery pack the necessary circuitry in the garden equipment can be reduced and instead increasing the complexity of the battery pack processing circuitry. This is beneficial, due to the fact that most users today have a greater number of garden tools than battery packs as mentioned above since a battery fits a wide variety of garden equipment.

Another advantage with having a more advanced battery pack is that it is easier to update the battery pack with new functionality then the garden equipment itself. For example, the battery pack may be updated every time it is charged.

BRIEF DESCRIPTION OF DRAWINGS

The invention is now described, by way of example, with reference to the accompanying drawings, in which.

DESCRIPTION OF EMBODIMENTS

Figure 1:
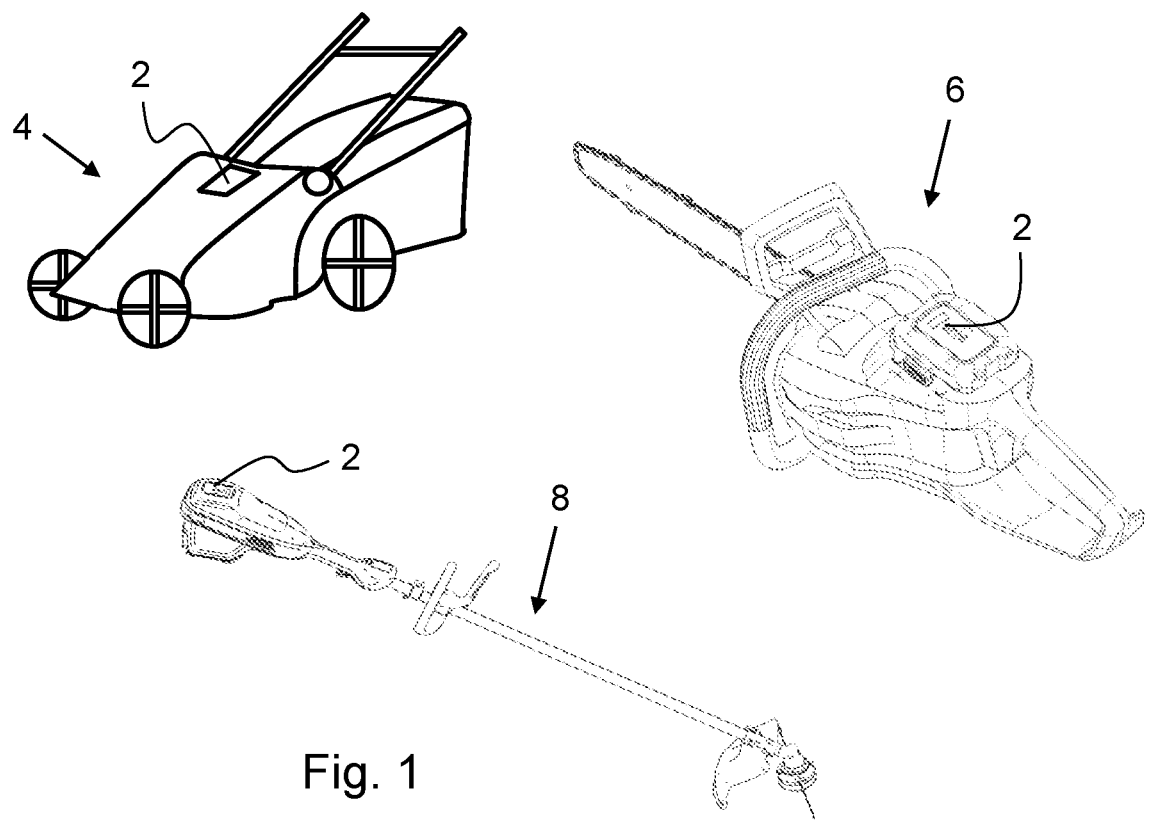
FIG. 1 schematically shows different types of garden equipment powered by a battery pack.

In the following, a detailed description of the present invention will be made. FIG. 1 schematically shows different types of garden equipment powered by a battery pack 2. In context of the present disclosure the term garden equipment should be interpreted broadly and comprise all types of different types of tools, devices and equipment that are battery powered and used in a garden. Such devices have been given many different names including power tools, garden tools, garden equipment, garden devices etc, which all are meant to be included in the term garden equipment. Examples of garden equipment include, hedge trimmers, mowers 4, blowers, chainsaws 6, trimmers 8, compressors, pruners, pumps etc., some of which are shown in FIG. 1.

Figure 2:
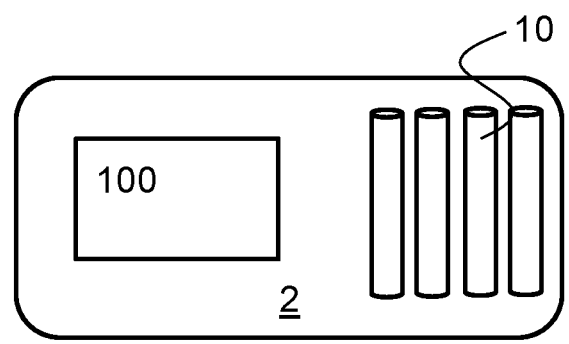
FIG. 2 schematically shows a battery pack comprising battery cells and a control unit.

Turning now to FIG. 2 a schematic view of a battery pack 2 is shown. The battery pack 2 is of a general type that fits and is compatible with a wide variety of different garden tools and may have different voltage ratings. As is well known by a skilled person the battery pack 2 comprises one or more battery cells 10, which may be arranged in series or in parallel to achieve the desired characteristic of the battery pack 2. The battery pack 2 also comprises a control unit 100, which will be closer described in conjunction with FIG. 3.

Figure 3:
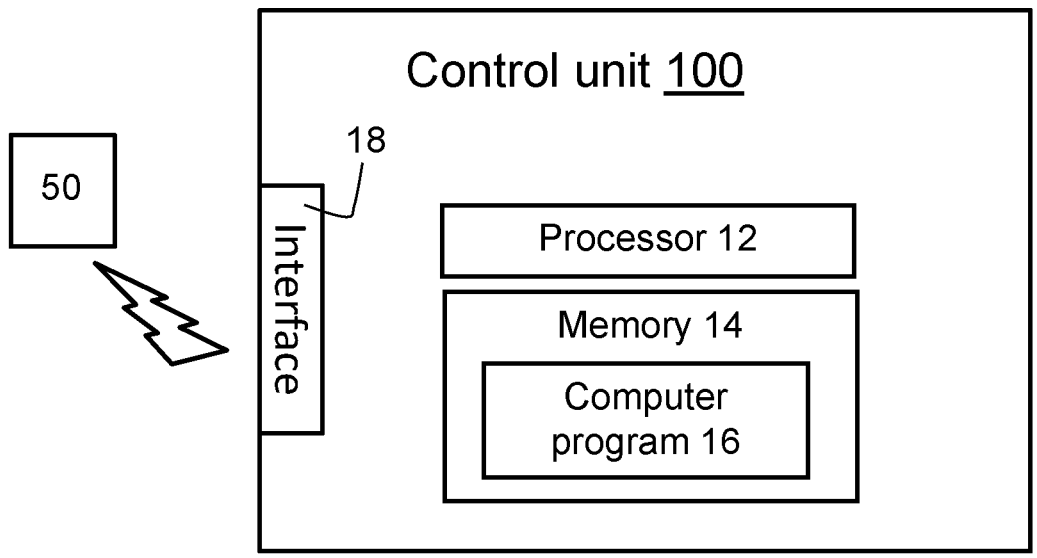
FIG. 3 shows a detailed view of a control unit.

FIG. 3 shows the control unit 100 in greater detail. The control unit 100 comprises a processor 12 and a non-transitory computer-readable medium, such as a memory 14. In context of the present application the term processor 12 should be interpreted broadly as processing circuitry, which may comprise one or more programmable processor, application-specific integrated circuits, field programmable gate arrays or combinations of these (not shown) adapted to execute instructions. The non-transitory computer-readable medium 14 contains instructions executable by said processing circuitry, whereby the control unit 100 is operative to capture and send data from the garden tool. The data may for example be different sensor data from sensors in the garden equipment or from the battery cells or control data for controlling the garden equipment.

The control unit 100 further comprises an interface 18, which may be considered to comprise conventional means for communicating with the multiple sensors in the garden equipment and external devices 50. For example, the interface 18 may comprise means for being connected to a Controller Area Network, CAN, for communication with the sensors in the garden equipment. The interface 18 may also comprise means for wireless communication with external devices 50, such as smart phones or for wired communication with other external devices 50, such as computers. In another embodiment the interface 18 may also be configured to act as a data interface to be used when the battery pack 2 is inserted into a charger, which charger receives data from the battery pack 2. The charger may in turn be connected to Internet, wireless or wired, such that the received data may be transferred to an external user device 50. The instructions executable by the processor 12 may be arranged as a computer program 16 stored e.g. in the memory 14. The processor 12 and the memory 14 may be arranged in a sub-arrangement. The sub-arrangement may be a microprocessor and adequate software and storage therefore, a Programmable Logic Device, PLD, or other electronic component(s)/processing circuit(s) configured to perform the method, which will be closer described below.

The computer program 16 may be carried by a computer program product connectable to the control unit 100. The computer program product may be the memory 14. The memory 14 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 14. Alternatively, the computer program 16 may be stored on a server or any other entity connected to the control unit and has access via the interface 18. The computer program 16 may then be downloaded from the server into the memory 14.

Figure 4:
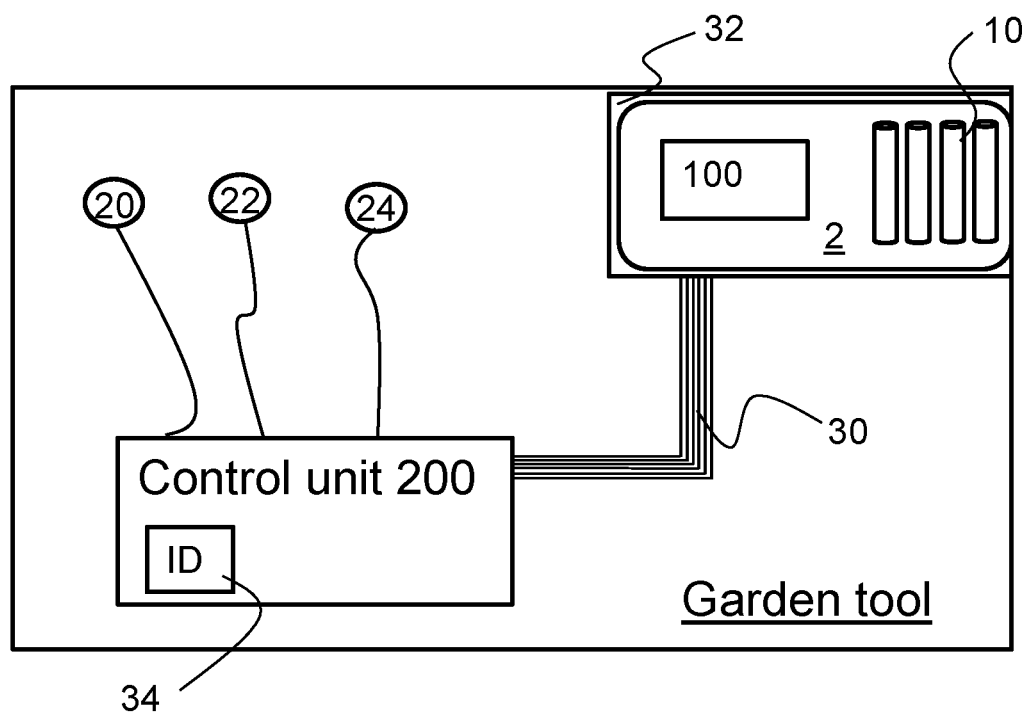
FIG. 4 schematically shows a garden tool having a battery pack inserted.

Turning now to FIG. 4 the garden tool having the battery pack 2 inserted will be described. The battery pack 2 is inserted in a recess 32 or receptacle of the garden equipment or tool. In the inserted state the battery pack 2 provides the garden equipment with power and is also connected to a control unit 200 of the garden equipment via a data bus 30, such as CAN. The control unit 200 of the garden equipment may, as the control unit 100, comprise a memory and a processor (not shown). The control unit 200 is connected to different sensors 20, 22 and 24 of the garden equipment and configured to collect sensor data and send the sensor data to the control unit 100 of the battery pack 2. In another embodiment the control unit 200 may be configured to tunnel the sensor data directly to control unit 100 of the battery pack 2. The battery pack 2 is configured to receive sensor data from a wide variety of sensors, such as accelerometers, gyros, current sensors, torque sensors, induction sensors, voltage sensors, sound sensors, vibration sensors, resistance sensors, RPM sensors, position sensors, temperature sensors, motion sensors etc.

The control unit 200 of the garden equipment also holds or comprises an identifier 34 that is unique for the specific garden tool into which the battery pack 2 is inserted. As will be described closer in conjunction with FIG. 5 this identifier 34 is read and used by the control unit 100 of the battery pack 2 for controlling the operation of the garden equipment. The complexity of the control unit 200 is kept to a minimum in order to reduce the cost for the control unit 200 in the garden tool. Preferably, the only object of the control unit 200 is to collect or tunnel sensor data to the control unit 100 of the battery pack 2 and to provide the control unit 100 of the battery pack 2 with the identifier 34. However, it is also possible that the control unit 200 comprises some basic garden equipment control functions. Since, as mentioned above, there are more garden tools then battery packs, overall costs can be saved by moving functionality from the garden tool to the battery pack 2. There is a further advantage with this approach and it is that the garden equipment will always be controlled by the latest updated software, since every time the battery pack 2 is charged it is possible to update or upgrade the operational software.

This means that the control unit 100 of the battery pack 2 and the control unit 200 of the garden equipment together create a complete control unit for the garden equipment. The control unit 200 in the garden tool itself will not be sufficient to run the garden tool. But when the battery pack 2 is inserted into the recess 32 the battery pack 2 and the control unit 100 will provide the power and the control circuitry to run the garden tool. The control unit 100 of the battery pack is also handling the memory 14 to store operational data of the garden tool and for example also error codes that are needed for informing a user or a service shop.

Figure 5:
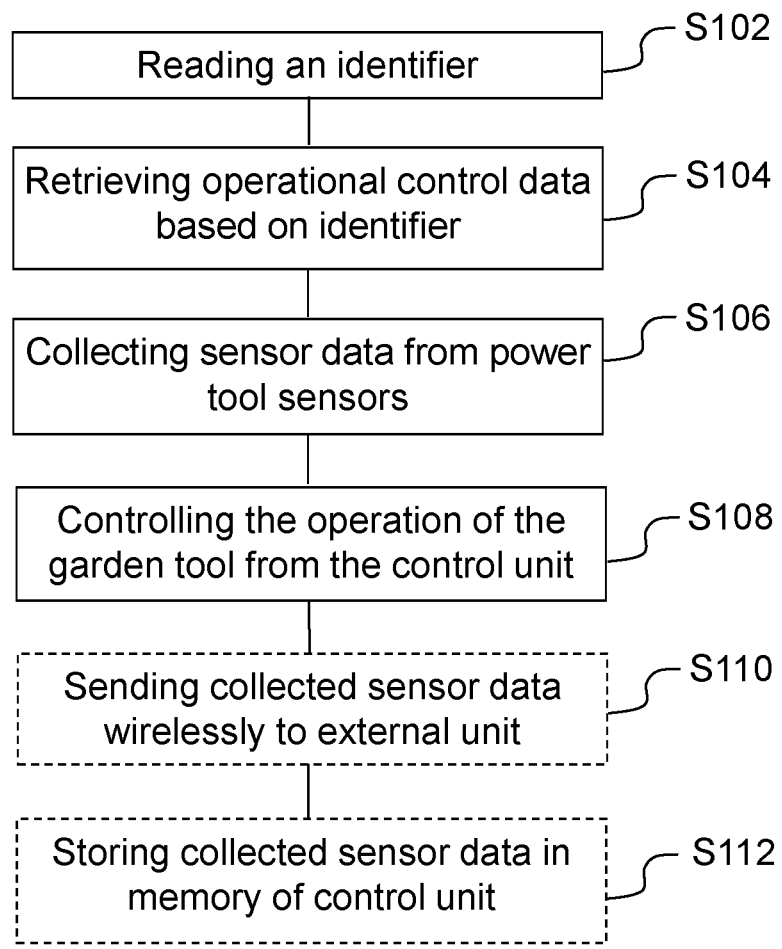
FIG. 5 shows a method for controlling operation of a garden tool.

Turning now to FIG. 5 a method for controlling the operation of a garden tool with the battery pack 2 will be closer described. As mentioned above the battery pack 2 comprises a control unit 100 for performing the method, when the battery pack 2 is inserted into the recess 32 of the garden equipment and in data communication with the control unit 200 the garden equipment.

Thus, when the battery pack is inserted and in data communication with the garden equipment the control unit 100 reads, in step S102, the identifier 34 of the garden equipment stored in the control unit 200, via the data bus 30. The identifier is unique for the specific garden tool and is used to identify which type of operational control data that the control unit 100 should use to control the garden tool. Thus, in step S104 the control unit 100 retrieves the operational control data for the specific garden equipment from the memory based on the retrieved identifier 34. Such control data may for example be which current that should be supplied by the battery pack to the garden equipment. This may be an important feature if battery packs with different voltage ratings fit in the same recess 32 and the supplied current has to be adapted to the unique garden equipment. The control unit 100 also collects, in step S106 sensor data from the garden equipment sensors 20; 22; 24 via the data bus 30. The sensor data may be collected directly from the sensors and tunneled through the control unit 200 or collected by and maybe stored in the control unit 200 before they are passed on via the data bus 30 to the control unit 100. The control unit 100 then controls, in step S108 the operation of the garden equipment based on the retrieved control data and the collected sensor data, via the data bus 30. Thus, in contrast to common practice it is the control unit 100 of the battery pack 2 that controls the garden equipment and not the control unit 200 in the garden equipment.

Examples of sensors 20; 22; 24 that generate sensor data that may be used to control the garden equipment are accelerometers, gyros, current sensors, torque sensors, induction sensors, voltage sensors, sound sensors, vibration sensors, resistance sensors, RPM sensors, position sensors, temperature sensors, motion sensors etc. In an exemplary embodiment the temperature of the motor of the garden equipment may be used to control the current supplied to the garden equipment. This may be very useful on a hot summer day when there else would be a risk of overheating.

In an exemplary embodiment the control unit 100 sends, in an optional step S110, the collected sensor data wirelessly, via the interface 18, to an external unit 50. Such an external unit may be a smart phone, a computer, a tablet or the like. The collected sensor data may also be transmitted to an external device when charging the battery pack 2 and the battery pack is connected to the charger and via the charger is in contact with Internet.

In another exemplary embodiment the method further comprises storing, in an optional step S112, the collected sensor data in the memory 14 of the control unit 100 such that the collected sensor data at a later stage may be transmitted to an external device 50 when for example charging the battery pack 2 and the battery pack is connected to the charger. The charger in turn may be in contact with Internet, which is used to transmit the collected sensor data to the external device.

Although, the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Furthermore, although individually listed, a plurality of means or elements may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc. do not preclude a plurality. Reference signs in the claims are provided merely as a clarifying example and shall not be construed as limiting the scope of the claims in any way.

The invention claimed is:

1. A method for controlling operation of any one of a plurality of garden tools with a single battery pack comprising a control unit for performing the method, when the battery pack is inserted into a recess of any one of the plurality of garden tools and in data communication, via a data bus, with a control unit of said one of the plurality of the garden tools, the method comprising
   reading, via the data bus, an identifier of said one of the plurality of garden tools,
   retrieving operational control data for said one of the garden tools from a non-transitory computer-readable medium of the control unit in the battery pack based on the identifier,
   collecting, via the data bus, sensor data from sensors of said one of the garden tools, and
   controlling, via the data bus, the operation of said one of the garden tools from the control unit in the battery pack based on the retrieved operational control data and the collected sensor data.

2. The method according to claim 1, wherein the method further comprises
   sending the collected sensor data wirelessly, via an interface, to an external unit.

3. The method according to claim 1, wherein the method further comprises storing the collected sensor data in the non-transitory computer-readable medium of the control unit in the battery pack.

4. The method according to claim 1, wherein the step of controlling further comprises controlling a current output from the battery pack to said one of the garden tools based on the collected sensor data.

5. A computer program comprising computer program code stored on a memory, the computer program code being adapted, if executed on a processor, to implement the method according to claim 1.

6. A battery pack for controlling operation of any one of a plurality of garden tools, when the battery pack is inserted into a recess of any one of the plurality of garden tools and in data communication, via a data bus, with a control unit of said one of the plurality of garden tools, said battery pack comprising a control unit comprising a processor and a non-transitory computer-readable medium, configured to store instructions, which when executed by the processor, cause the control unit to:

read, via the data bus, an identifier of said one of the garden tools, retrieve operational control data for said one of the garden tools from the non-transitory computer-readable medium of the control unit in the battery pack based on the identifier, collect, via the data bus, sensor data from sensors of said one of the garden tools, and control, via the data bus, the operation of said one of the garden tools from the control unit in the battery pack based on the retrieved control data and the collected sensor data.

7. The battery pack according to claim 6, wherein the control unit is further caused to:

send the collected sensor data wirelessly to an external unit.

8. The battery pack according to claim 6, wherein the control unit is further caused to:

store the collected sensor data in the non-transitory computer-readable medium of the control unit in the battery pack.

9. The battery pack according to claim 6, wherein the data bus is a controller area network.

10. The battery pack according to claim 6, wherein the battery pack is configured to receive data for determining torque, RPM, position, temperature or motion of said one of the garden tools from the sensors.

11. The battery pack according to claim 6, wherein the control unit is further caused to:

control a current output from the battery pack to said one of the garden tools based on the collected sensor data.

* * * * *